(12) United States Patent  
Courchesne et al.

(10) Patent No.: US 10,602,121 B2  
(45) Date of Patent: Mar. 24, 2020

(54) METHOD, SYSTEM AND APPARATUS FOR CAPTURE-BASED IMMERSIVE TELEPRESENCE IN VIRTUAL ENVIRONMENT

(71) Applicant: SOCIÉTÉ DES ARTS TECHNOLOGIQUES, Montréal (CA)

(72) Inventors: Luc Courchesne, Montréal (CA); Bruno Roy, Montréal (CA); Emmanuel Durand, Montréal (CA); Mike Wozniewski, Montréal (CA); Nicolas Bouillot, Montréal (CA)

(73) Assignees: SOCIÉTÉ DES ARTS TECHNOLOGIQUES, Montréal (CA); IDÉACTION INC, Montréal (CA)

( * ) Notice: Subject to any disclaimer, the term of this patent is extended or adjusted under 35 U.S.C. 154(b) by 116 days.

(21) Appl. No.: 15/022,779

(22) PCT Filed: Sep. 17, 2014

(86) PCT No.: PCT/CA2014/050888  
§ 371 (c)(1),  
(2) Date: Mar. 17, 2016

(87) PCT Pub. No.: WO2015/039239  
PCT Pub. Date: Mar. 26, 2015

(65) Prior Publication Data  
US 2016/0234475 A1   Aug. 11, 2016

Related U.S. Application Data

(60) Provisional application No. 61/878,796, filed on Sep. 17, 2013.

(51) Int. Cl.  
*H04N 13/204*   (2018.01)  
*H04N 7/15*   (2006.01)  
(Continued)

(52) U.S. Cl.  
CPC ....... *H04N 13/204* (2018.05); *G06K 9/00214* (2013.01); *G06K 9/00302* (2013.01);  
(Continued)

(58) Field of Classification Search  
None  
See application file for complete search history.

(56) References Cited

U.S. PATENT DOCUMENTS

| | | | | |
|---|---|---|---|---|
| 7,719,563 | B2 * | 5/2010 | Richards | G06F 3/04815 |
| | | | | 348/36 |
| 2003/0067536 | A1 * | 4/2003 | Boulanger | H04N 7/15 |
| | | | | 348/14.08 |

(Continued)

*Primary Examiner* — Heather R Jones  
(74) *Attorney, Agent, or Firm* — Norton Rose Fulbright Canada LLP

(57) ABSTRACT

An apparatus for capture-based telepresence in a virtual environment session, comprises 3D capture devices to continuously capture image data of a first user. A processing unit comprises: an image processor for continuously producing a first 3D representation of the first user based on the image data, the first 3D representation having at least punctually a user specific position in a virtual environment. A data transmitter transmits the first 3D representation for remote use in the virtual environment session. A data receiver continuously receives a second 3D representation of a second user, image data for the virtual environment, and at least punctually receiving user specific position of the second 3D representation relative to the virtual environment. A rendering engine outputs for display the 3D representation of the second user positioned relative to the first user as inserted in the virtual environment based on said user specific positions. A method for participating in a virtual environment session is also provided.

20 Claims, 13 Drawing Sheets

(51) Int. Cl.
  *G06K 9/00*   (2006.01)
  *G06T 19/00*  (2011.01)
  *H04S 7/00*   (2006.01)

(52) U.S. Cl.
  CPC ..... *G06K 9/00315* (2013.01); *G06K 9/00355* (2013.01); *G06T 19/006* (2013.01); *H04N 7/157* (2013.01); *H04S 7/303* (2013.01); *H04S 2400/15* (2013.01)

(56) References Cited

U.S. PATENT DOCUMENTS

| | | |
|---|---|---|
| 2003/0234859 A1 | 12/2003 | Malzbender et al. |
| 2004/0104935 A1* | 6/2004 | Williamson ............ G06F 3/012 715/757 |
| 2004/0130614 A1* | 7/2004 | Valliath ................. H04N 7/147 348/14.01 |
| 2009/0262194 A1 | 10/2009 | Wakefield et al. |
| 2012/0192088 A1* | 7/2012 | Sauriol ................. G06F 3/011 715/757 |
| 2012/0229446 A1 | 9/2012 | Hyndman et al. |
| 2014/0192087 A1* | 7/2014 | Frost ....................... G06F 3/011 345/633 |

\* cited by examiner

METHOD, SYSTEM AND APPARATUS FOR CAPTURE-BASED IMMERSIVE TELEPRESENCE IN VIRTUAL ENVIRONMENT

CROSS-REFERENCE TO RELATED APPLICATION

The present application claims priority on U.S. Provisional Patent Application Ser. No. 61/878,796, filed on Sep. 17, 2013.

TECHNICAL FIELD

The present application relates to virtual reality with telepresence capability.

BACKGROUND OF THE ART

Due to the mass availability of networked computers with ever-increasing processing power and of peripherals such as webcams and microphones, imaged telecommunications have evolved and are commonly available and used on a global scale, for instance, as Skype™, Facetime™ and the like. These technologies operate real time photorealistic telecommunications by which participants and their background environments are telecommunicated in real time, for participants remote from each other to communicate visually. Such systems have limitations, notably in the 2D (two-dimensional) rendering of images and the stagnant background of the participants.

Other communication and collaboration platforms, such as Second Life™ or World of Warcraft™, propose shared on-line virtual 3D environments (persistent worlds) where participants, appearing as avatars, are able to move around, operate, transform the space, meet and collaborate with one another. The avatars are virtual objects and hence do not allow non-verbal communication clues such as eye contact, posturing and spatial positioning, which clues could enhance inter-personal communication and group collaboration. Another limitation of all above system is the use of standard flat screen monitors in such systems, which limits the immersion in spite of the virtual 3D environments.

SUMMARY

It is therefore an object of the present disclosure to provide a method, system and apparatus for a capture based representation of participants in an immersive telepresence virtual environment session.

Therefore, in accordance with an embodiment of the present disclosure, there is provided an apparatus for capture-based telepresence in a virtual environment session, comprising: at least one three-dimensional (3D) capture device to continuously capture image data of a first user; a processing unit comprising at least: an image processor for continuously producing a first 3D representation of the first user based on the image data, the first 3D representation having at least punctually a user specific position in a virtual environment; a data transmitter for transmitting the first 3D representation for at least a remote use in the virtual environment session; a data receiver for continuously receiving a second 3D representation of a second user, image data for the virtual environment, and at least punctually receiving user specific position of the second 3D representation relative to the virtual environment; and a rendering engine for outputting at least the 3D representation of the second user positioned relative to the first user as inserted in the virtual environment based on said user specific positions; at least one display device for displaying the output.

Further in accordance with the embodiment of the present disclosure, the at least one display device comprises an immersive image screen deployed in up to 360° around the participant.

Still further in accordance with the embodiment of the present disclosure, the at least one display device is one of a hemispherical screen, a frusto-spherical screen, a cylindrical screen, a set of flatscreens, tablet and head mounted display with orientation tracking, with the first user physically located in a central portion of said at least one display device.

Still further in accordance with the embodiment of the present disclosure, three of the 3D capture device are provided, with the first user physically located in a central portion relative to the 3D capture devices surrounding the first user.

Still further in accordance with the embodiment of the present disclosure, an audio capture device continuously captures audio data emitted at least by the first user and for transmission via the data transmitter for at least a remote use in the virtual environment session; an audio driver for producing audio content of the second user received by the data receiver; and speakers for outputting the audio content.

Still further in accordance with the embodiment of the present disclosure, the audio capture device, and the speakers are part of a multi-channel audio system deployed in up to 360° around the participant.

Still further in accordance with the embodiment of the present disclosure, a command processor receives commands from the first user and for transmission via the data transmitter for interfacing with the virtual environment session.

Still further in accordance with the embodiment of the present disclosure, an interface communicates with the command processor.

Still further in accordance with the embodiment of the present disclosure, the first 3D representation has at least punctually a user specific position and orientation in the virtual environment, and further wherein the data receiver receives at least punctually a user specific position and orientation of the second user, the rendering engine outputting the 3D representation of the second user oriented relative to the virtual environment.

Still further in accordance with the embodiment of the present disclosure, the rendering engine outputs a reference orientation landmark for calibration of the first user's orientation in the virtual environment, and wherein the user specific orientation of the first user is based on the reference orientation landmark.

Still further in accordance with the embodiment of the present disclosure, the rendering engine outputs a mirror image of the processed 3D representation of the first user as the reference orientation landmark, the mirror image being orientable to set the user specific orientation of the first user.

Still further in accordance with the embodiment of the present disclosure, the at least one 3D capture device continuously captures a 3D point cloud of the first user.

Still further in accordance with the embodiment of the present disclosure, the at least one 3D capture device continuously captures the 3D point cloud of the first user with chromatic and luminance data.

Still further in accordance with the embodiment of the present disclosure, there is provided a system for operating a virtual environment session, comprising: at least two of the apparatus described above; and a virtual environment server comprising: a virtual environment manager for providing the image data for the virtual environment and for managing a coordinate system of a virtual environment based on at least on the user specific position and orientation of the users in the virtual environment.

Still further in accordance with the embodiment of the present disclosure, the virtual environment server further comprises an asset manager for recording and storing modifications to the virtual environment.

Still further in accordance with the embodiment of the present disclosure, the virtual environment server further comprises a control unit for administrating virtual environment sessions, the administrating comprising at least one of login, troubleshooting, technical support, calibrating, events synchronisation, stream monitoring, access privileges/priority management.

In accordance with another embodiment of the present disclosure, there is provided a method for participating in a virtual environment session comprising continuously receiving image data of a first user; continuously producing a first 3D representation of the first user based on the image data, the first 3D representation having at least punctually a user specific position and orientation in a virtual environment; transmitting the first 3D representation for at least a remote use in the virtual environment session; continuously receiving a second 3D representation of a second user, image data for the virtual environment, and at least punctually receiving user specific position of the second 3D representation relative to the virtual environment; and outputting for display at least the 3D representation of the second user positioned relative to the first user as inserted in the virtual environment based on said user specific positions.

Further in accordance with the other embodiment of the present disclosure, there is provided continuously receiving audio data emitted at least by the first user and transmitting the audio data for at least a remote use in the virtual reality session.

Still further in accordance with the other embodiment of the present disclosure, there is provided continuously receiving and producing audio content of the second user received by the data receiver.

Still further in accordance with the other embodiment of the present disclosure, there is provided receiving commands from the first user and transmitting the commands for interfacing with the virtual environment session.

Still further in accordance with the other embodiment of the present disclosure, there is provided receiving at least punctually a user specific orientation of the second user, and outputting for display the 3D representation of the second user oriented relative to the virtual environment based on the user specific orientation of the second user.

Still further in accordance with the other embodiment of the present disclosure, there is provided outputting a reference orientation landmark for calibration of the first user's orientation in the virtual environment, the user specific orientation of the first user based on the reference orientation landmark.

Still further in accordance with the other embodiment of the present disclosure, outputting the reference orientation landmark comprises outputting a mirror image of the 3D representation of the first user as the reference orientation landmark, the mirror image being orientable to set the user specific orientation of the first user.

Still further in accordance with the other embodiment of the present disclosure, continuously receiving image data comprises continuously receiving a 3D point cloud of the first user.

Still further in accordance with the other embodiment of the present disclosure, continuously receiving a 3D point cloud of the first user comprises receiving chromatic data for points of the 3D point cloud.

Still further in accordance with the other embodiment of the present disclosure, continuously producing a first 3D representation of the first user comprises downsampling the 3D point cloud by removing redundant points.

Still further in accordance with the other embodiment of the present disclosure, continuously producing a first 3D representation of the first user comprises filtering the 3D point cloud by removing outlier point.

Still further in accordance with the other embodiment of the present disclosure, continuously producing a first 3D representation of the first user comprises creating a 3D mesh using the 3D point cloud.

Still further in accordance with the other embodiment of the present disclosure, continuously producing a first 3D representation of the first user further comprises projecting chromatic data of the 3D point cloud on the 3D mesh.

DETAILED DESCRIPTION OF THE EMBODIMENTS

Figure 1:
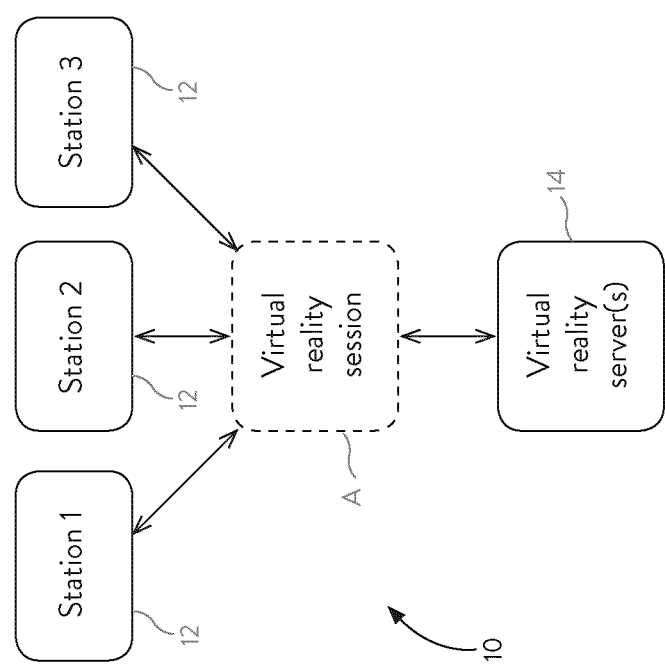
FIG. 1 is a block diagram of a system for hosting a virtual reality session with photorealistic telepresence capability.

Referring to the drawings and more particularly to FIG. 1, there is illustrated at 10 a system for hosting a virtual reality session with photorealistic (capture based) telepresence capability for participants, where participants are incorporated (as 2D or 3D entities) in a shared virtual environment. The expression "photorealistic" may be defined as incorporating realistic morphological cues of a participant's anatomy as obtained by capturing devices, the morphological cues including the eye contact, facial expressions, body language, positioning and posture. The resolution may vary, but the photorealism of the system 10 is sufficient to recognize some of the morphological cues mentioned above. In an embodiment, the participants are not simply overlaid on a flat 360° panorama, but incorporated in a 3D virtual world where they may move around while the scene is constantly being redrawn to match their point on view. For simplicity purposes, reference will be made hereinafter to the system 10. The system 10 hosts a virtual environment session A. The virtual environment session A may be one in which an immersive 360-degree virtual environment featuring the entire or a substantial part of the horizon is displayed, with participants being virtually present in the session A as photorealistic 2D or 3D (three-dimensional) representations of themselves, in real time or quasi-real time. Moreover, the virtual environment session A may allow the participants to communicate audibly with one another, although the audible communication is optional. In the virtual environment session A, spatialization of objects, including the participants, is respected, with each object, including the participants, having a specific location within the virtual environment, with dynamic modifications being represented in real time. In an embodiment, the participants are represented in 3D photorealistic representations, and this allows an expression of the participants' body language by the representation of orientation, position and movements. The virtual environment sessions A may provide a permanent or transient virtual environment for the participants to meet in a context where non-verbal communication cues, such as eye contact and posturing, are reproduced.

The shared virtual environment may be anything from a blank space to a content rich and/or generative metaworld whose characteristics will be the subject of the encounters or, more simply, serve as contexts for encounters, conversations, collaborative projects, etc. These shared environments may be capture-based (photorealistic) environment (e.g., captured images and photogrammetry or video of a real location), a synthetic environment, or a combination thereof.

The characteristics of these virtual environments may support uses such as social network environments, virtual meeting spaces, informative/educational spaces, training and simulation environments, gaming environments, brainstorming sandboxes (drawing spaces), real world monitoring environments (control rooms), real-time data visualisation and analysis environments, complex system modelization environments, etc. . . . .

The control offered to each participant may include mirror functions to calibrate the participant's representation, navigation functions to let a participant move within the space. Other toolbox like functions such as drawing, form generation and placement, audio, visual or textual recording, may let the participant interact with and transform the environment.

Parameters access for the control of privacy (visibility), access (public/private spaces, home settings), editing (personal content management), tools and shortcuts may also be included.

In FIG. 1, the virtual environment session A (i.e., virtual environment) is displayed at stations 12, also known as the apparatuses 12. Three different stations 12 are illustrated in FIG. 1, but the virtual environment session A may involve a single one of the stations 12 or more than the three stations 12 shown in FIG. 1. As the telecommunication between stations 12 may be network-based or cloud-based, other stations 12 may join in, or several different virtual reality sessions may take place simultaneously. The stations 12 are discreet locations in which a participant is captured visually to then be represented in the virtual environment session A. The stations 12 are locations at which participants enter to become immersed within the shared virtual environment session A. The stations 12 will be described in further detail hereinafter.

Figure 11:
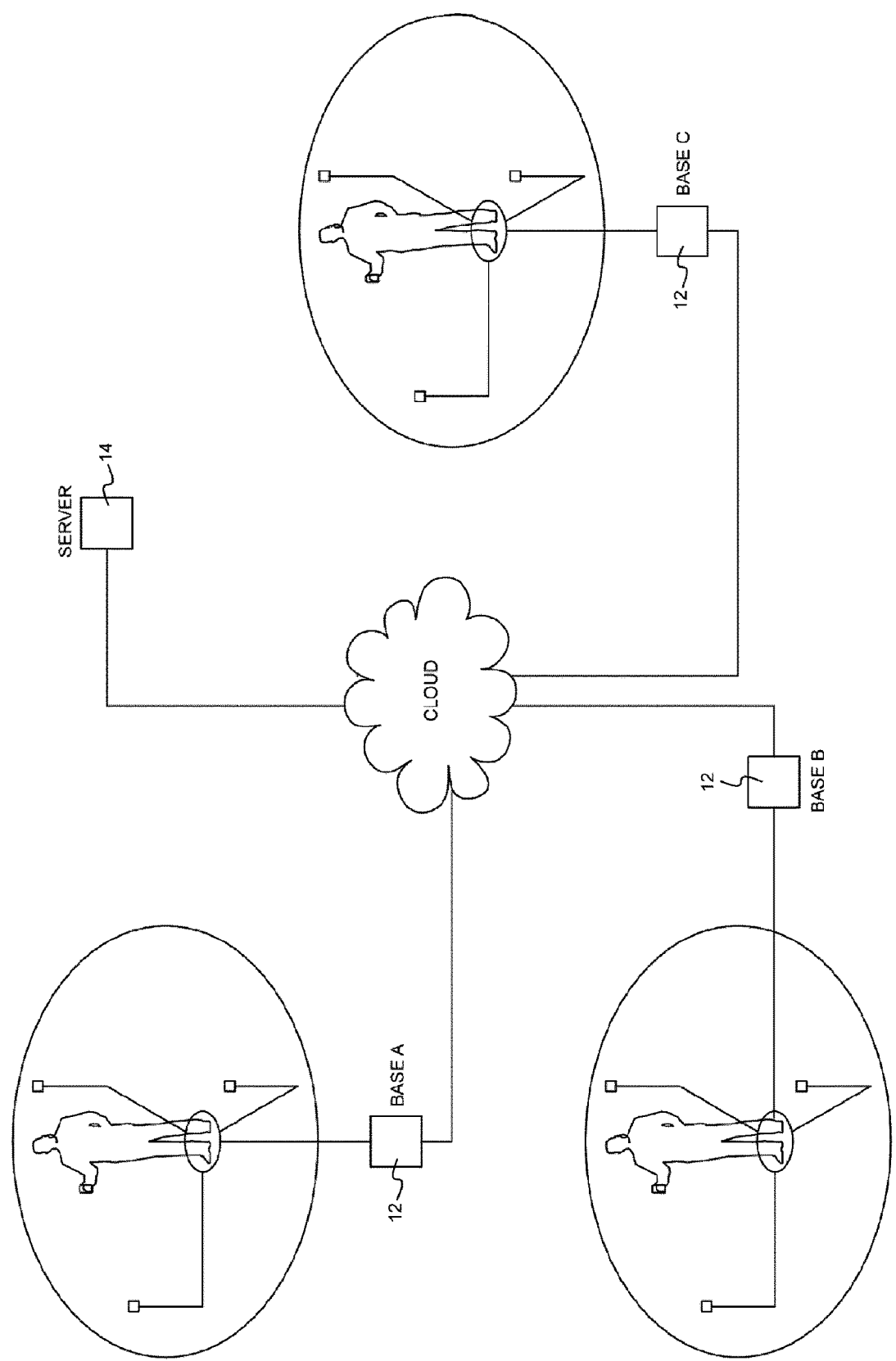
FIG. 11 is a schematic view of the system of FIG. 1 for hosting a virtual reality session with photorealistic telepresence capability.

Still referring to FIGS. 1 and 11, a virtual environment server 14 operates the virtual environment session A, notably by providing and updating a shared virtual environment, including a position and/or orientation of the participants. The server 14 may also be used to manage and control the virtual environment session A. In an embodiment, the processing performed by the virtual environment servers 14 may be performed instead by the stations 12. However, the configuration of FIG. 1 is well suited to reduce the processing performed by the stations 12, by having one or more servers acting as the virtual environment server(s) 14, with a cloud-based approach that may be more robust, as shown in FIG. 11. The system 10 as shown in FIG. 1 may have additional components.

Figure 2:
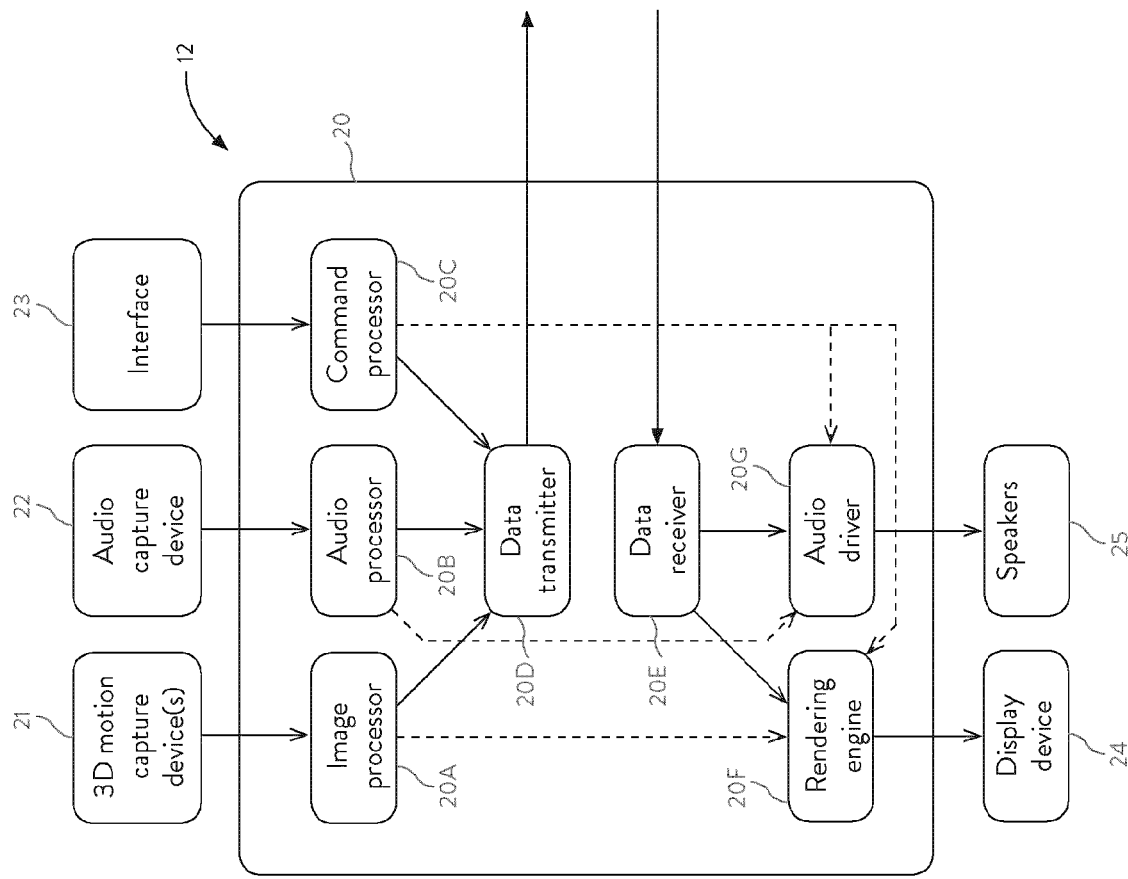
FIG. 2 is a block diagram of a station of the system of FIG. 1.

Referring to FIG. 2, there is illustrated one of the stations 12 in greater detail. The station 12 comprises the hardware forming a physical environment to accommodate a participant, and the hardware and software to locally host the virtual environment session A. In other words, the station 12 is responsible for capturing images, sound and/or control data of the local participant, to transmit this information to the virtual environment session A. Likewise, the station 12 is responsible for outputting visually and audibly the constantly updated virtual environment session A for the participant locally occupying the station 12.

Accordingly, the station 12 comprises a processing unit 20. The processing unit 20 is typically a computer (e.g., personal computer, such as a desktop or laptop) that is connected to a plurality of peripherals to perform the functions stated above. The processing unit 20 incorporates a plurality of software modules that will enable the station 12 to locally host and participate in the virtual environment session A. The processing unit 20 thus has sufficient processing speed in order to host the virtual environment session A, considering that the computer processing may apply only a subset of the whole session.

Figure 3:
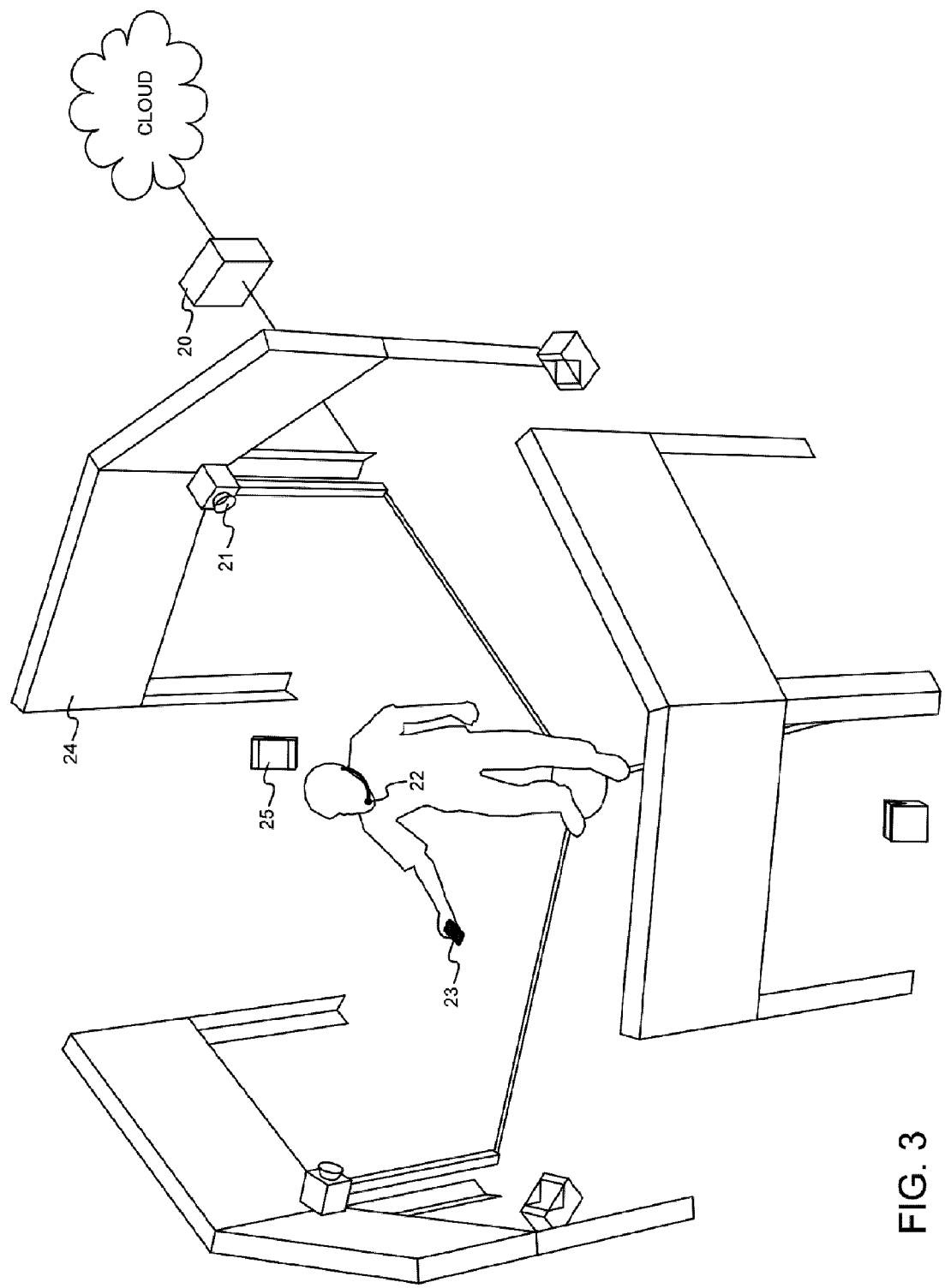
FIG. 3 is a schematic view illustrating an embodiment of the station of FIG. 2, involving flat screens.

Referring concurrently to FIGS. 2 and 3, the station 12 has capture devices 21, such as 3D capture devices, for capturing image data to subsequently produce a photorealistic 3D representation of the participant(s). Although the station 12 may operate with a single one of these devices, an embodiment has at least three of these 3D capture devices 21 in order to produce the photorealistic 3D representation of the participant in the station 12. For instance, the 3D capture devices 21 are at least three point-cloud capture units, such as the Kinect™ or PrimeSense™, that may be equidistantly disposed horizontally around the participant, disposed to capture the entirety of the participant or group of participants. These 3D capture devices 21 concurrently produce a cloud of points that is subsequently used to model the participant, the point cloud being a set of points described by position in space (3 components~$\{x,y,z\}$). The cloud of points may be linked to RGB texture and depth map. The cloud of points may contain enough data for the model to produce a photorealistic 3D representation of the participant;

the point cloud data can also be used to create a mesh onto which a video texture the RGB textures obtained from the same 3D capture devices 21 are applied, as described hereinafter. The resulting model may also have a node to orient and position the participant within the virtual environment of the session A. Suitable lighting may also be provided to ensure that the image capture is of quality.

As another example, technologies such as time-of-flight tracking or photogrammetry may be used to capture sufficient image data that may be used to produce a 3D representation of the participant as described hereinafter.

An audio capture device 22 is also provided in the station 12. The audio capture device 22 may take various forms and is used to record sounds produced by the participant of the station 12 and his/her environment. For instance, one or more microphones may be used in any appropriate configuration.

An interface 23, such as a handheld device (e.g., remote control, smartphone, etc.), may be provided for the participant to perform commands related to the virtual environment session A. Among various possibilities, the interface 23 may be used by the participant to modify his/her position within the virtual environment, i.e., to move within the environment. The interface 23 may also be used for the participant to draw and/or displace objects of the virtual environment, to operate various actions, to operate the processor unit 20, etc. Hence, if the interface 23 is a handheld device, appropriate command buttons, sliders and the likes, grouped into a variety of screens, are provided thereon (e.g., an application on a smartphone to control the virtual environment). In an embodiment, the interface 23 may be the participant himself/herself, with a part of the body of the participant that projects eccentrically from a remainder of the body being recognized as a desired interfacing action (gesture control). For instance, an extended arm may be regarded as an interfacing action and hence be identified as such by the processing unit 20. The interface 23 may provide a mirror function to let a participant adjust his/her representation in order to align its position in relation to the world and thus calibrate eye contact and coherent body language such as positioning and pointing in relation to the shared environment. Other functions of the interface may include menus for selecting, joining and leaving virtual reality sessions, or for setting parameters allowing control of privacy (visibility), access (public/private spaces, home setting), editing (personal content management), tools and shortcuts.

Figure 4:
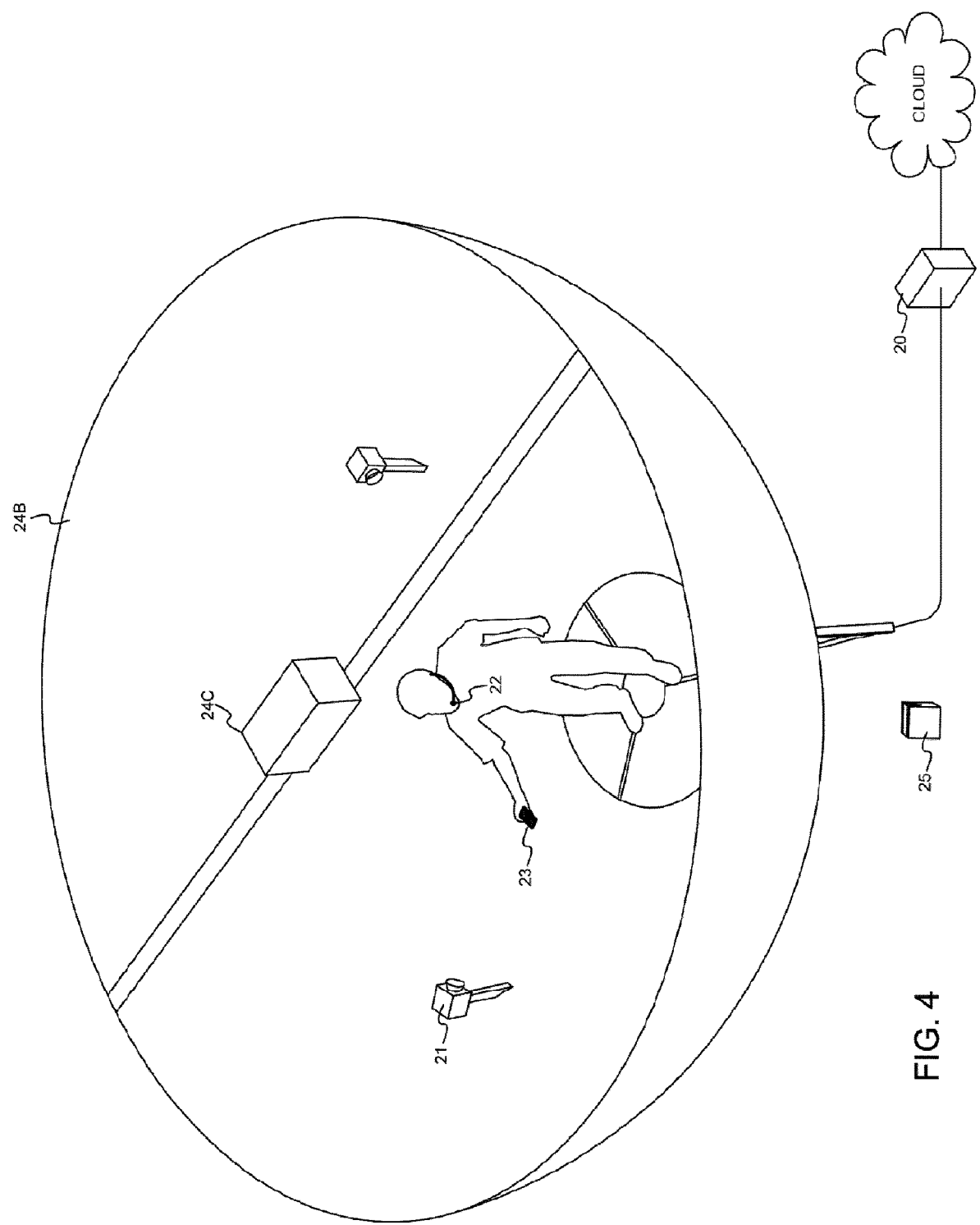
FIG. 4 is a schematic view showing an embodiment of the station of FIG. 2, with a hemispherical screen.
Figure 6:
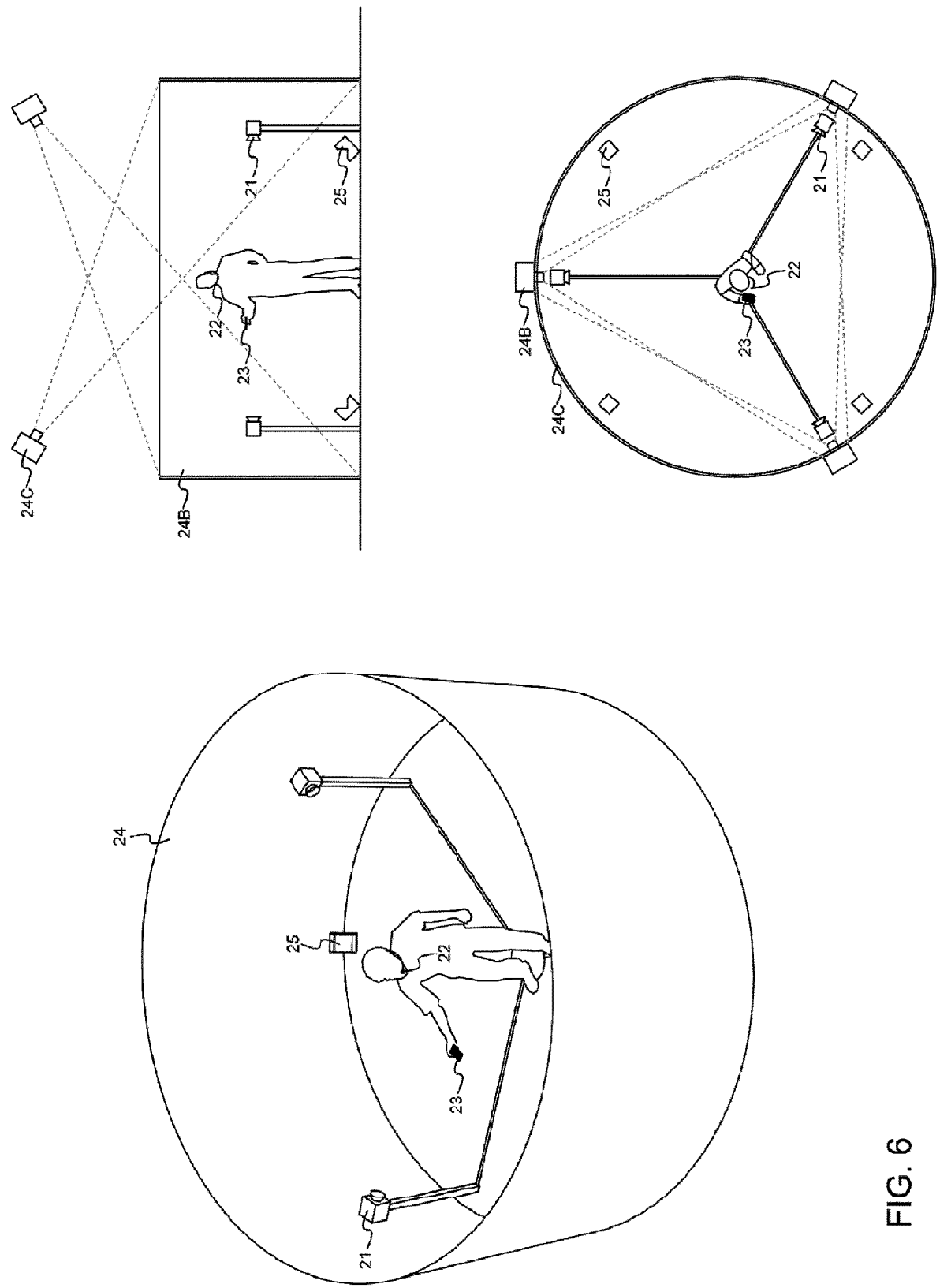
FIG. 6 are schematic elevation and plan views illustrating an embodiment of the station of FIG. 2, involving a cylindrical screen.
Figure 7:
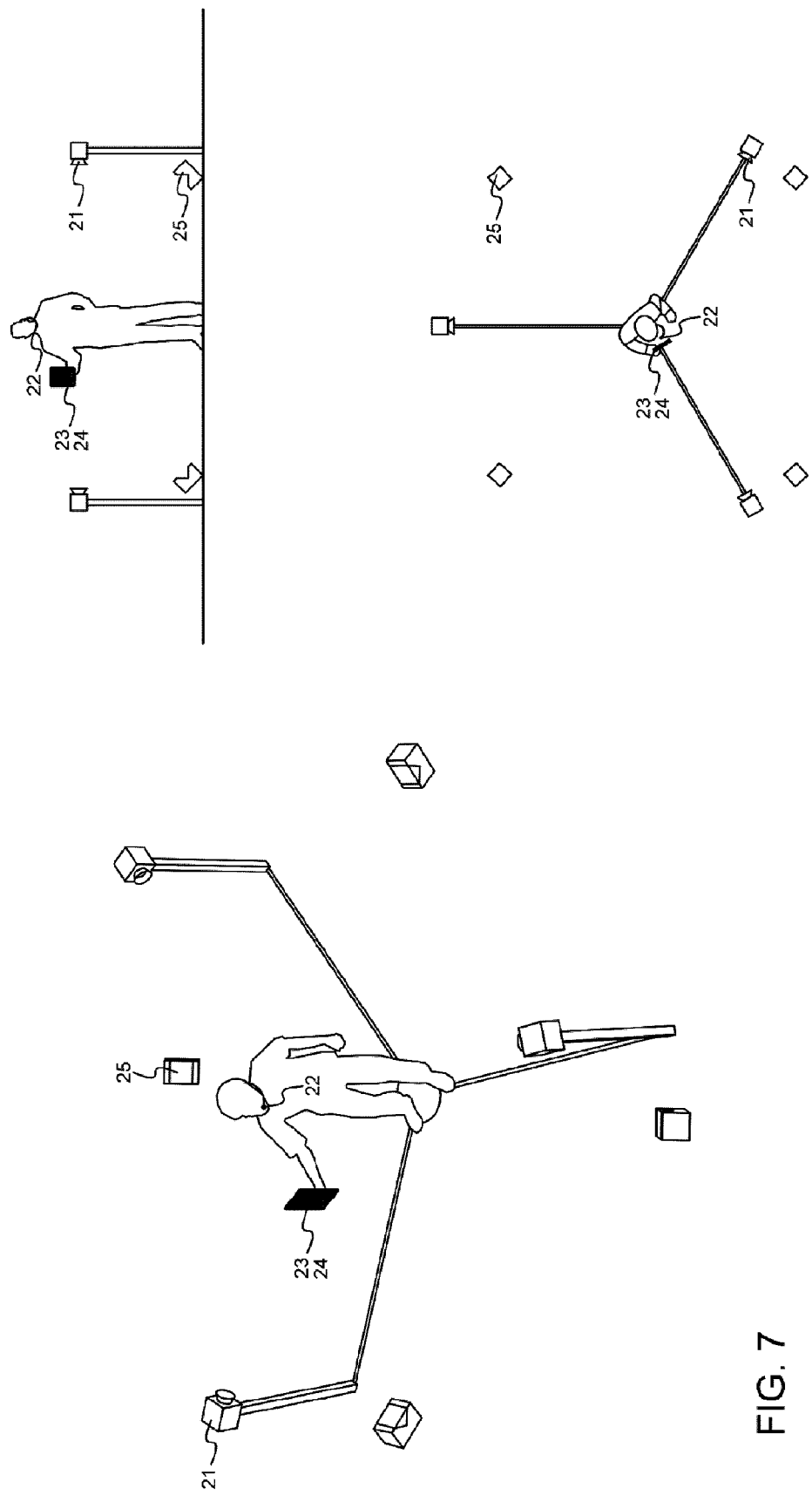
FIG. 7 are schematic elevation and plan views illustrating an embodiment of the station of FIG. 2, involving a hand-held screen.
Figure 8:
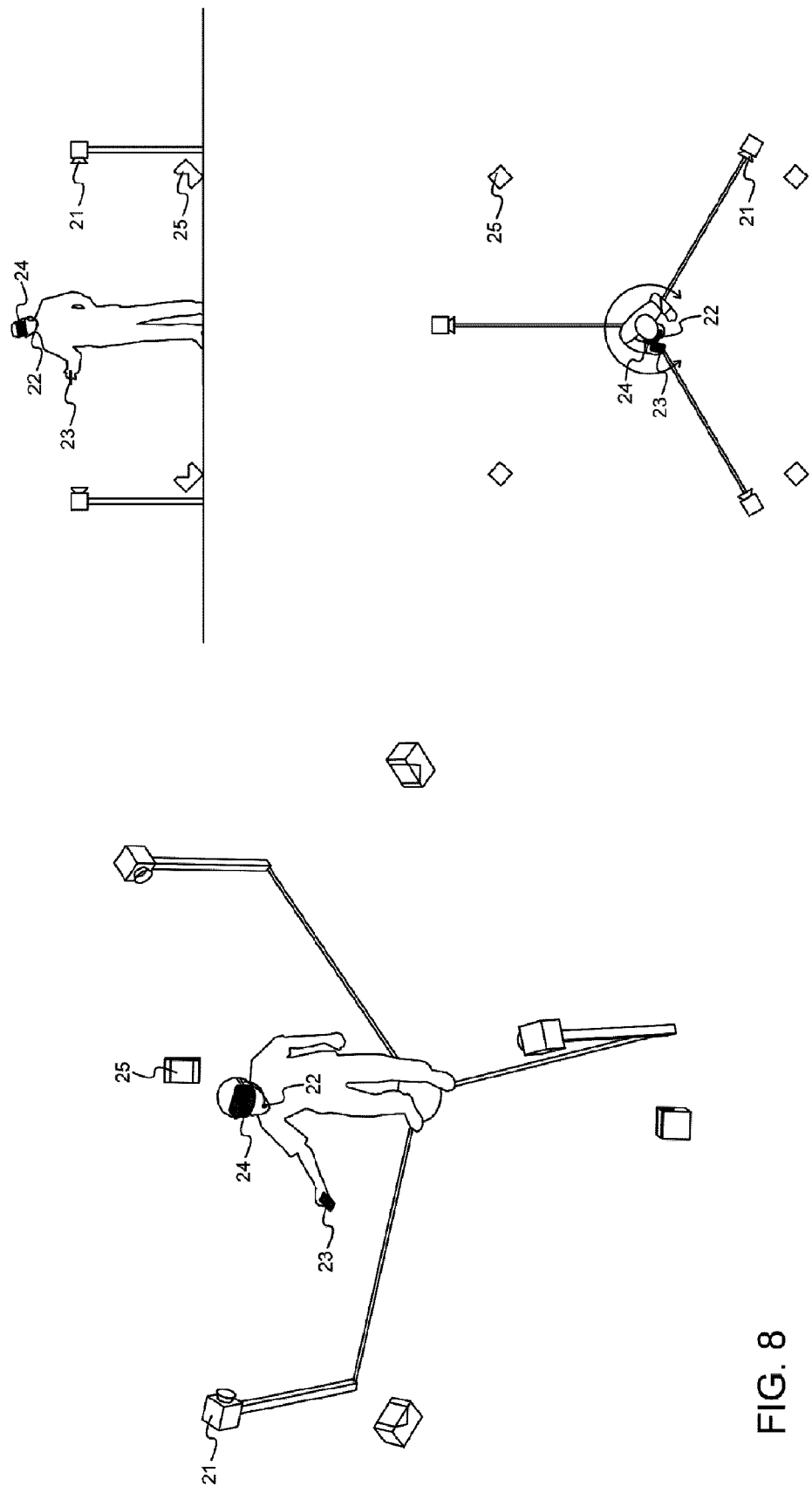
FIG. 8 are schematic elevation and plan views illustrating an embodiment of the station of FIG. 2, involving a head-mounted display.
Figure 9:
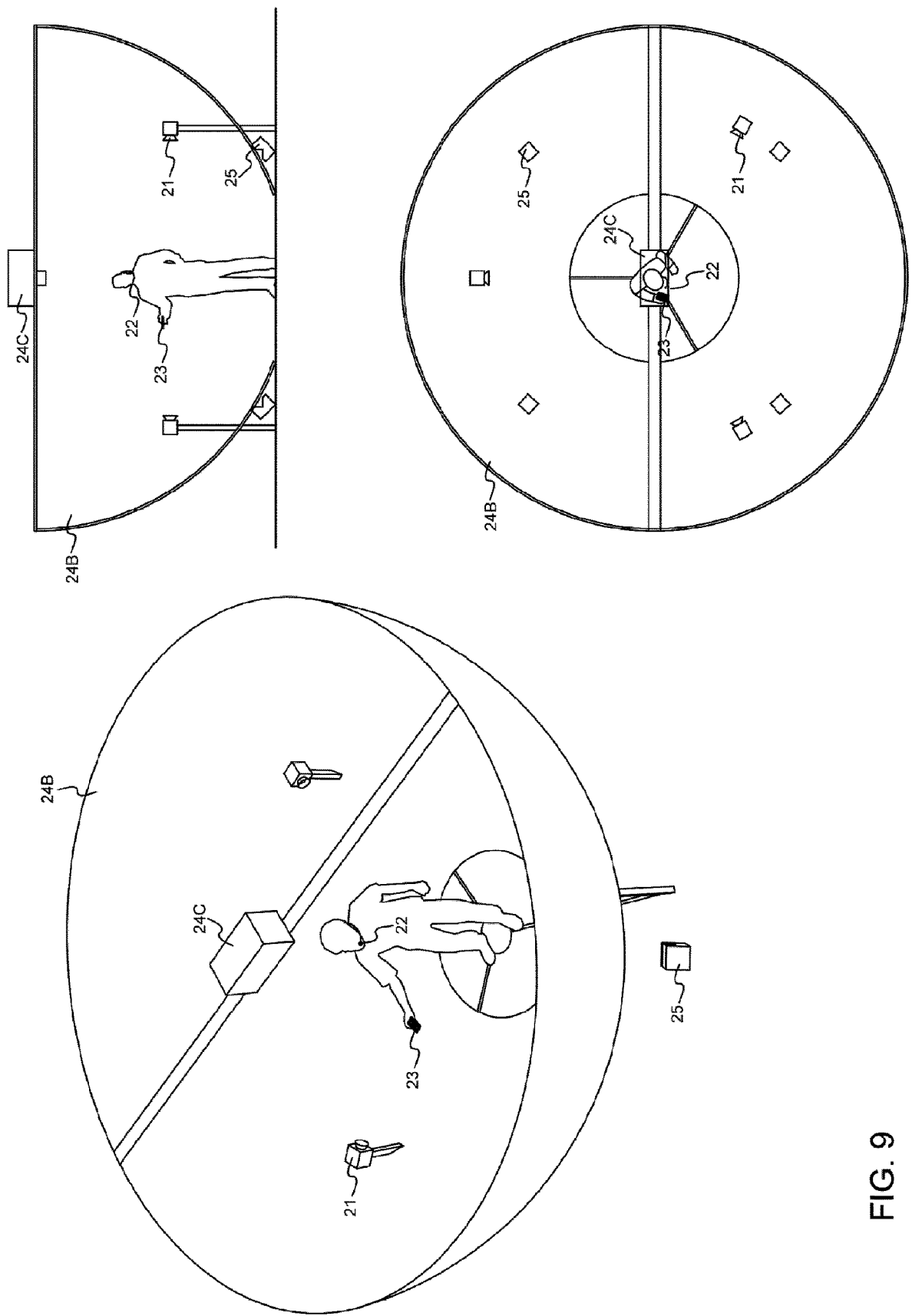
FIG. 9 are schematic elevation and plan views illustrating an embodiment of the station of FIG. 2, involving a hemispherical screen.
Figure 10:
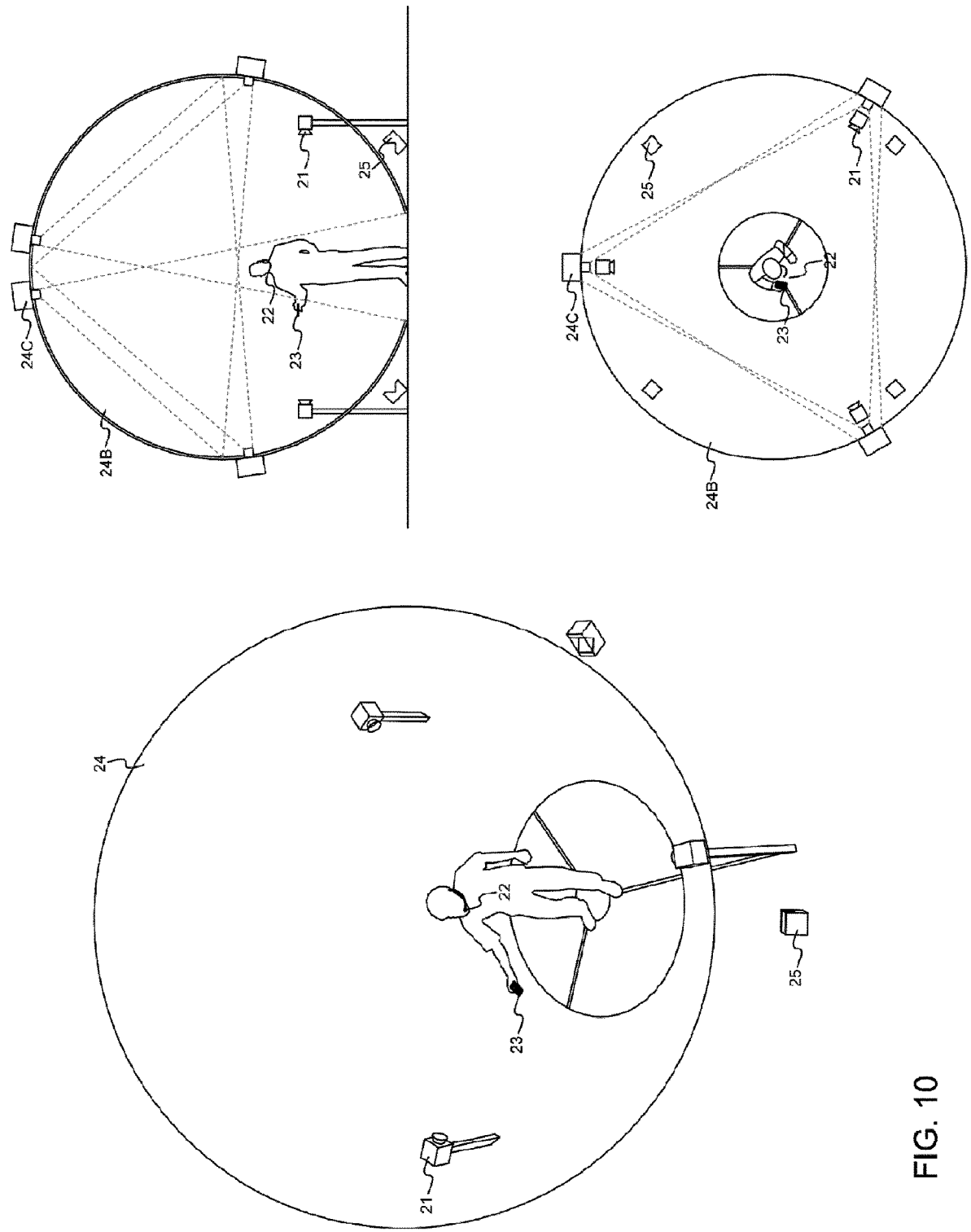
FIG. 10 are schematic elevation and plan views illustrating an embodiment of the station of FIG. 2, involving a spherical screen.

Still referring to FIGS. 2 and 3, a display device 24 is provided to display the virtual environment with the photorealistic 3D images representations of remote participants, within the virtual environment. As shown in FIG. 3, the display device 24 may be a plurality of flat screens 24A arranged to surround the participant by 360 degrees, with the participant being immersively located in the center of the display device(s) 24. This represents a cost-effective solution by which computer monitors or digital television sets are used. FIG. 4 shows that the display device 24 may be a hemispherical screen used with appropriate projectors, as an exemplary embodiment. The hemispherical screen is shown as 24B while the projector is shown as 24C. For instance, the hemispherical screen 24B and projector 24C are as described in the U.S. Pat. No. 6,905,218, by Courchesne (also shown in FIG. 9). Other configurations include a cylindrical screen (FIG. 6), spherical displays and domes (FIG. 10), cycloramas, handheld screen (FIG. 7), and head-mounted displays (FIG. 8) with orientation tracking and inertial sensors, etc.

Speakers 25 may also be a peripheral of the station 12. The speakers 25 may be that of the television sets in the example of FIG. 3 or may alternatively be simple stand-alone speakers, for example. It is desired to have multiple sound channels feeding multiple speakers 25 to provide some form of stereo effect or spatialized sound related to the location of the various participants in the virtual environment. Indeed, the relative relation between participants in the virtual environment session A can be rendered in terms of sound. For instance, the amplitude of the sound emitted by the speakers 25 may be adjusted as a function of the position of the sound source (i.e., the participant) within the virtual environment session A. The speakers may be replaced by headphones, for instance equipped with orientation tracking to simulate the virtual 3D sound environment.

Referring to FIG. 2, the processor unit 20 has a plurality of modules to treat the captured data and transmit it to the virtual environment session A. Likewise, the processing unit 20 has modules by which the data received from the virtual environment session, i.e., the virtual environment servers 14, is output in the form of images and sound, to reproduce the virtual environment session A.

The image processor 20A, also referred to as a point cloud processor, receives the raw or processed image data obtained by the capture devices 21. The image data may be a cloud of points with chromatic and luminance information, or may be raw images that will be processed by the image processor 20A to be converted into a 3D representation of the user in the form of a point cloud. The image processor 20A may perform some form of filtering, cropping, merging and modelling (e.g., image data fusion or point cloud imaging, meshing, texturing). In an example, the image data is a cloud of points, and the image processor 20A receives this point cloud output from multiple 3D capture devices 21, for instance from the three shown in FIG. 3, whereby some of the points will be redundant. The image processor 20A may process this raw data to produce a smoothened model of the participant. The image processor 20A may thus create a photorealistic model, or may produce different effects, such as a cartoon-like representation of the participant. As mentioned above, one possibility is that the image data captured is typically in the form of a stream of a point cloud in an x, y and z coordinate system, with the points comprising additional data such as colour (RGB), etc, as required as a function of the desired quality of the model. In an effort to reduce bandwidth use, these point cloud (data sets) can be transformed into mesh onto which an image texture obtained from the capture device 21 may be applied for adequate image resolution and smaller data sets. The image processor 20A and the capture devices 21 operate concurrently to continuously update the model, such that the model is a real time representation of the participant and his/her position within the shared environment. Continuously or related expressions are used hereinafter to describe an action repeated at a given frequency over an amount of time, i.e., during the virtual environment session. While a continuous action may be interrupted during the virtual environment session, it will nonetheless be maintained over a given frequency.

According to an embodiment, the point cloud processor 20A receives updated point clouds from each 3D capture device 21. Each point cloud goes through a first pass of clipping, to keep only the region of interest: the participant and his/her surroundings. The surroundings (featuring the virtual environment in which the participant is immersed) may be kept to enable a correct and precise calibration of the multiple point clouds. A second pass may then be applied, in which the geometrical transformation is executed from the calibration on the point clouds. An optional auto-calibration may be used to enhance the input calibration. A third pass may be performed to crop the resulting point cloud to keep only the point cloud of the participant. Finally, this point cloud is sent to the data transmitter 20D either as is, or compressed through a reduction of the point cloud density (points close to each other are merged relatively to a distance parameter) and/or through a lossless compression algorithm. An additional transformation may be applied to the point cloud dataset to create a mesh onto which a video an image texture is applied. This texture may be captured live by the same point cloud/RGB capture devices or pre-recorded and used as wearable skins.

Considering that the station 12 must share image data with a virtual environment server 14, it may be desirable to reduce as much as possible the bandwidth necessary while maintaining a photorealistic representation of the participant. In an embodiment, additional processing is performed on the cloud of points to reduce the size of the data set sent to a remainder of the system 10, while maintaining adequate photorealism. The cloud of points produced by the 3D capture devices 21 is a noisy point cloud. The point cloud produced by the 3D capture devices 21 is downsampled (i.e., reducing the sample density of the 3D point cloud) and filtered to get rid of some of the noise. For example, as mentioned above in the case in which the image data is a 3D cloud point, there are some redundant points and the downsampling and filtering allows the reduction of the number of points, and hence computation time is reduced. Different techniques may be used for the filtering, including using existing techniques like VoxelGrid filter. Subsequently, the downsampled point cloud is used to generate a coarse mesh, i.e., set of vertices, edges and faces that define the shape of a geometric model. For example, the Marching Cubes method may be used to generate the mesh, the Marching Cube method being an algorithm dedicated to the extraction of a polygonal mesh from three-dimensional scalar field. This technique may be combined with average position approach to create a smooth surface, to reduce the discontinuities present on surface. This smoothing step lessens the square feeling resulting from the use of Marching Cubes.

A refining step is then performed to combine the coarse mesh to the point cloud. As the mesh was created with the downsampled point cloud, this refining uses the original point cloud to update minute details lost in the coarse meshing, by essentially projecting the chromatic data onto the coarse mesh. By way of an example, signed distance field (SDF) is used to update the coarse mesh with the input point cloud. The direction of the displacement applied is based on the normal vector of the nearby vertex. Before updating the mesh, polygons having higher density of points are subdivided, the polygons being surfaces bound by straight line segments. The polygons are subdivided using the input point cloud. As a result, the final mesh will increase its faithfulness to the fine details.

These steps are performed by the image processor 20A such that the signal sent to the data transmitter 20D is substantially reduced in terms of bandwidth. It is also considered to add a mesh decimation (i.e., a reduction of the vertex density where there is less details) to keep details only where needed, to reduce the size of the mesh. The texture is then obtained by projecting the images (RGB) from the capture devices 21 onto the mesh. The blending between the multiple images can be improved by matching detected features.

The audio processor 20B will receive the sound from the audio capture device 22. The audio processor 20B may also attribute positional data to the sound, for instance, if multiple audio capture devices 22 are provided. Moreover, the audio processor 20B may perform some filtering to remove noise.

A command processor 20C receives the commands from the interface 23, whether the interface 23 is a discrete device or movements performed by the participant. In the latter embodiment, the command processor 20C will recognize such movements and interpret them as desired interface actions from the participant.

The image stream provided by the image processor 20A and the audio stream provided by the audio processor 20B must be synchronized, to avoid or reduce any lag between image and sound, in the virtual reality session A. In an embodiment, the real time processing by modules 20A and 20B results in the image stream and the audio stream being synchronized. The data from the modules 20A, 20B and possibly 20C is provided to the data transmitter 20D who will telecommunicate the data to the virtual reality session A, i.e., via the other participating stations 12 and the virtual reality server 14. According to an embodiment, the data transmitter 20D produces a composite signal for instance along multiple channels, incorporating the various streams of image and audio data, with synchronization therebetween. The data transmitter 20D may be wired, wireless, with any adequate components, such as encoders, compressors, etc. Any adequate protocol may be used by the data transmitter module 20D. For simplicity, the data transmitter module 20D uses the internet to communicate with the stations 12 and/or servers 14, and the composite signal is compressed.

The data transmitter 20D receives inputs from the point cloud, audio and command processors. The multiple inputs can be sent independently, or packed together to ensure synchronization whatever the characteristics of the network. Also, every source/packet can be sent to a multiplicity of receivers, allowing the data to be used locally as well as on any given number of distant stations.

Still referring to FIG. 2, a data receiver 20E receives data from the virtual environment sessions A. For instance, the data receiver 20E receives virtual environment data stream by which the virtual environment will be reproduced on the display devices 24 of the station 12. Moreover, if other participants are in other stations 12 in the arrangement of FIG. 1, the data receiver 20E will receive image and audio data streams therefrom for the telerepresentation of the participants in the virtual environment. The data receiver 20E receives and unpacks the packets sent by the distant stations, and makes them available for use by the rendering engine and the audio driver, or any other local unit.

A rendering engine 20F is connected to the data receiver 20E and is used to produce on the display device(s) 24 the virtual environment incorporating the telerepresentations of the various participants. It is pointed out that the image processor 20A may be connected to the rendering engine 20F directly, such that a participant may see his/her own telerepresentation in the virtual environment as produced by his/her own station 12. The rendering engine 20F may have 3D rendering capability to produce 3D images of the participants, and may perform some image treatment (e.g., color adjustment, contrast adjustment, rendering). In an embodiment, the image treatment of models of remote participants is commanded by the local participant via the interface 23.

An audio driver 20G is connected to the speakers 25. The audio driver 20G receives the audio data stream from the data receiver 20E. In an embodiment, the audio data stream received by the audio driver 20G is identified with channel data, so as to produce a depth effect for the sound that is output by the speakers 25. For instance, there may be a channel per speaker, and the audio driver 20G is configured to output sound in the appropriate channels, as a function of the spatial location of the sound source with the virtual environment.

In similar fashion to the image processor 20A and rendering engine 20F, the audio processor 20B and the audio driver 20G may communicate directly within the processing unit 20. The command processor 20C may also be in direct contact with the rendering engine 20F and the audio driver 20G, for instance to allow control functions to be performed by the local participant on the image and sound.

Figure 5:
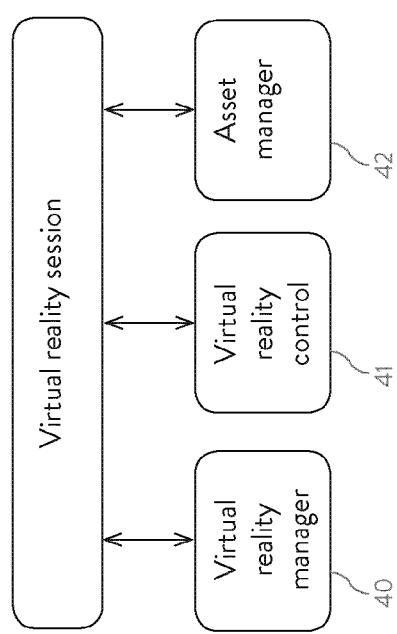
FIG. 5 is a block diagram of a virtual reality server of the system of FIG. 1.

Referring to FIG. 5, there is illustrated an embodiment of the virtual environment server 14. According to this embodiment, the virtual environment server 14 has different modules, different servers, or any other appropriate configuration. For simplicity, reference is made to a single server 14 although other configurations are contemplated.

The virtual environment server 14 has a virtual environment manager 40. The virtual environment manager 40 provides the data stream representing the shared virtual environment (i.e., the background or context). This shared virtual environment may be based locally with only the changes of its configuration being transmitted on the network to other stations. The data stream may thus comprise image and/or sound data related to the virtual environment. For instance, if the virtual environment is a representation of a real location, the data stream may be an actual video and audio stream of the real location. According to an embodiment, the data stream is a live or quasi-live feed of a real location, with the virtual environment manager 40 performing some signal processing to telecommunicate the feed in appropriate format.

The virtual environment session A may have spatialization management capability. Hence, the virtual environment manager 40 manages a 3-axis coordinate system of the shared virtual environment (including a "north"—i.e., a reference orientation), and thus monitors and stores the position and orientation of the participant representations relative to the virtual environment. In an embodiment, each discrete item in the virtual environment session A has a node (or family of nodes), representing the position of the discrete item in the coordinate system. In addition to a node (or family of nodes), each discrete item may have an orientation, relative to a reference orientation of the 3-axis coordinate system of the virtual environment. Any movement of object (i.e., change in node coordinates) is monitored and stored, and shared with the stations 12 to update the images of the virtual reality session A. Likewise, the 3D representations may be provided with a user specific position and/or orientation when received from the stations, such that the user may control his/her location in the virtual environment. While the 3D representations are continuously updated, the user specific position and/or orientation may be provided occasionally (or punctually) as part of the 3D representation stream, for instance at calibration and/or when there is a variation in the user's position and/or orientation in the virtual environment.

A virtual environment control unit 41 may also be provided. The virtual environment control unit 41 is typically used by the operator of the virtual environment session A. The virtual environment control 41 therefore allows management of the virtual environment session A for instance in terms of login, troubleshooting, technical support, and to support the use of the system 10 by independent stations 12. Operations performed by the control unit 41 may include as well calibrating, stream monitoring, access privileges/priority management, etc.

Finally, the asset manager 42 may be equipped with a database that will keep updated data of the various virtual environment sessions A, when such sessions are permanent or semi-permanent (persistent worlds). For instance, if the virtual environment session A is modified or transformed by the participants or by internal generative algorithms, the asset manager 42 may keep such a record of the modifications, to restore the virtual environment session A, for future uses. In an embodiment, the virtual environment may be created by the participants or by internal generative algorithms and thus stored in the asset manager 42. The virtual environment manager 40 comprises numerous modules similar to that of the stations (e.g., data transmitter module, data receiver module), which are not shown in the figures, for simplicity.

While the above description involves a client-server network with the virtual reality server 14, it is contemplated to operate virtual environment sessions in a peer-to-peer arrangement between stations 12. In such cases, the various functions and modules of the server 14 would be supplied by the stations 12.

Figure 12:
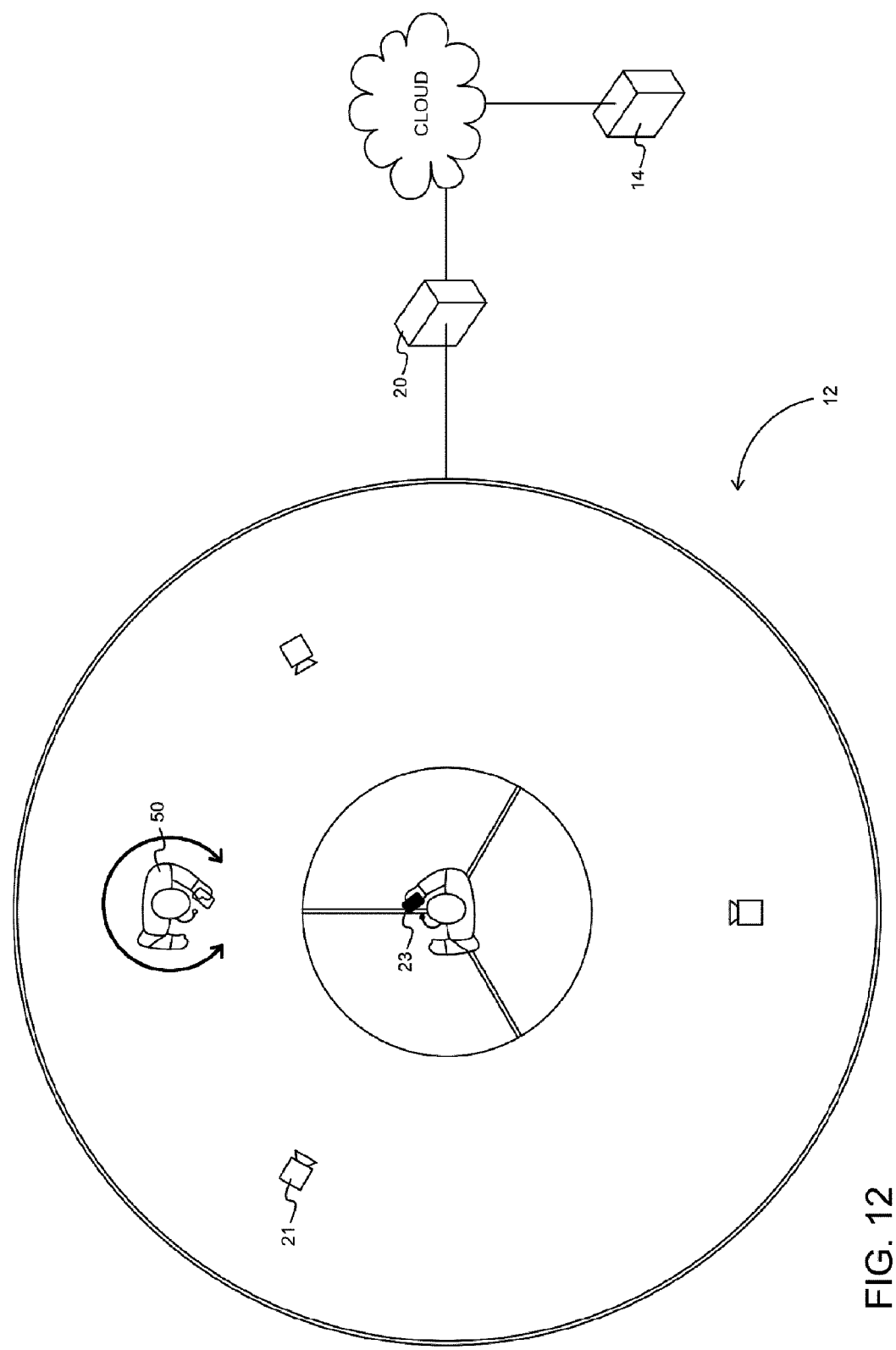
FIG. 12 is a schematic plan view of the system of FIG. 4, with a user performing an orientation calibration.

Referring to FIG. 12, there is illustrated a mirror function occurring at the stations 12. The mirror function is one of a few techniques considered to calibrate a participant's orientation in the virtual environment. Indeed, it is desirable to share a reference orientation, i.e., a common North, such that the physical orientation of the user in his/her local station 12 is converted into a virtual orientation of the user in the virtual environment, which virtual orientation is common to all participants in the virtual environment sessions. Hence, the spatialization managed by the server 14 may include the reference orientation in addition to the x, y and z position. By calibrating the orientation of the participants relative to the reference orientation, it is possible for a participant to orient himself/herself to be face to face with another participant. Likewise, by such a calibration, a participant may point to an item and the other participants will be capable of observing what the first participant is pointing at.

In FIG. 12, a mirror image 50 of the participant is produced locally, using the image data captured by the capture devices 21. The image processor 20A and the rendering engine 20F may thus output this virtual mirror image of the participant. The participant is then required to adjust an orientation of his/her mirror image until a predefined orientation is reached: for example, when the his own mirror image is face to face with the participant. When the predefined orientation is reached, the command processor 20C receives the confirmation from the participant, whether it be using the interface 23, or by performing recognizable movements. The orientation of the mirror image is then sent to the server 14 as part of the 3D representation, and the server 14 may calibrate the participant's orientation relative to the reference orientation using this data.

Other methods are also possible to calibrate the orientation, for instance by projecting a reference orientation landmark (e.g., a vertical line) in the virtual environment for local display. The participant is then requested to orient himself/herself to face the reference orientation landmark—upon a standstill of a few seconds, the image data is recorded relative to the reference orientation. Yet another method considered to calibrate the orientation is to perform some form of morphological recognition of the participant's anatomy. For example, the image processor 20A may be programmed to recognize the participant's eyes and then relate the orientation of the participant relative to the reference orientation based on this recognition.

According to another embodiment, the 3D representation communicated by the data transmitter 20D is a point cloud without chromatic and/or volumetric data, i.e., a skeleton. In such a case, the other local station 12 or the server 14 may provide chromatic and/or volumetric data to be projected and/or attached onto the skeleton. For example, other local stations may perform this chromatic and/or volumetric data projection based on pre-registered images/models of the participants. This arrangement may be suitable when a set of participants frequently participate in virtual reality sessions together in order to reduce bandwidth requirements.

Figure 13:
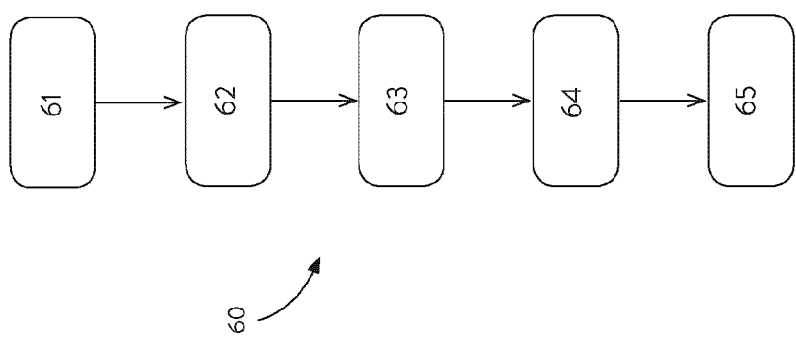
FIG. 13 is a flowchart illustrating a method for participating in a virtual environment session in accordance with the present disclosure.

Referring to FIG. 13, a method for participating in a virtual environment session is generally shown at 60. The method 60 may for instance be performed by the processor unit 20 of any one of the stations 12. In method 60:

61 comprises continuously receiving image data of a first user; 61 may also include continuously receiving audio data emitted at least by the first user and transmitting the audio data for at least a remote use in the virtual reality session, and continuously receiving and producing audio content of the second user received by the data receiver. The method 60 may also include receiving commands from the first user and transmitting the commands for interfacing with the virtual environment session, receiving at least punctually a user specific orientation of the second user, and outputting for display the 3D representation of the second user oriented relative to the virtual environment based on the user specific orientation of the second user, outputting a reference orientation landmark for calibration of the first user's orientation in the virtual environment, the user specific orientation of the first user based on the reference orientation landmark, and outputting a mirror image of the 3D representation of the first user as the reference orientation landmark, the mirror image being orientable to set the user specific orientation of the first user. 61 may also include continuously receiving image data comprises continuously receiving a 3D of the first user, and continuously receiving a 3D point cloud of the first user comprises receiving chromatic data for points of the point cloud.

62 comprises continuously producing a first 3D representation of the first user based on the image data, the first 3D representation having at least punctually a user specific position in a virtual environment; 62 may also include continuously producing a first 3D representation of the first user comprises downsampling the 3D point cloud by removing redundant points, filtering the 3D point cloud by removing outlier point, creating a 3D mesh using the 3D point cloud, and projecting chromatic data of the 3D point cloud on the 3D mesh 63 comprises transmitting the first 3D representation for at least a remote use in the virtual environment session;

64 comprises continuously receiving a second 3D representation of a second user, image data for the virtual environment, and at least punctually receiving user specific position of the second 3D representation relative to the virtual environment;

65 comprises outputting for display at least the 3D representation of the second user positioned relative to the first user as inserted in the virtual environment based on said user specific positions.

The invention claimed is:

1. An apparatus for capture-based telepresence in a virtual environment session, comprising:
at least one three-dimensional (3D) capture device to continuously capture image data of a first user;
a processing unit comprising at least:
an image processor for continuously producing a first 3D representation of the first user based on the image data and for calibrating a user specific orientation as a function of a reference orientation a virtual environment, the calibrating including determining the user specific orientation from a morphology of the first user's anatomy, the first 3D representation having at least punctually a user specific position and said user specific orientation in a virtual environment;
a data transmitter for transmitting the first 3D representation for at least a remote use in the virtual environment session;
a data receiver for continuously receiving a second 3D representation of a second user, image data for the virtual environment, and at least punctually receiving user specific position and user specific orientation of the second 3D representation relative to the virtual environment, the user specific orientation of the second user being calibrated so as to be a function of the reference orientation of the virtual environment; and
a rendering engine for outputting at least the 3D representation of the second user positioned relative to the first user as inserted in the virtual environment based on said user specific positions and on said user specific orientations;
at least one display device for displaying the output.

2. The apparatus according to claim 1, wherein the at least one display device comprising an immersive image screen deployed in up to 360° around the participant.

3. The apparatus according to claim 2, wherein the at least one display device is one of a hemispherical screen, a frusto-spherical screen, a cylindrical screen, a set of flatscreens, tablet and head mounted display with orientation tracking, with the first user physically located in a central portion of said at least one display device.

4. The apparatus according to claim 1, comprising three of the 3D capture device, with the first user physically located in a central portion relative to the 3D capture devices surrounding the first user.

5. The apparatus according to claim 1, further comprising:
an audio capture device to continuously capture audio data emitted at least by the first user and for transmission via the data transmitter for at least a remote use in the virtual environment session;
an audio driver for producing audio content of the second user received by the data receiver; and
speakers for outputting the audio content.

6. The apparatus according to claim 5, wherein the audio capture device, and the speakers are part of a multi-channel audio system deployed in up to 360° around the participant.

7. The apparatus according to claim 1, further comprising a command processor to receive commands from the first user and for transmission via the data transmitter for interfacing with the virtual environment session.

8. The apparatus according to claim 7, further comprising an interface for communicating with the command processor.

9. The apparatus according to claim 1, wherein the rendering engine outputs a reference orientation landmark for calibration of the first user's morphology relative to the reference orientation in the virtual environment, and wherein the user specific orientation of the first user is based on the reference orientation landmark.

10. The apparatus according to claim 9, wherein the rendering engine outputs a mirror image of the processed 3D representation of the first user as the reference orientation landmark, the mirror image being orientable to set the user specific orientation of the first user.

11. The apparatus according to claim 1, wherein the at least one 3D capture device continuously captures a 3D point cloud of the first user.

12. The apparatus according to claim 11, wherein the at least one 3D capture device continuously captures the 3D point cloud of the first user with chromatic and luminance data.

13. The apparatus of claim 1, wherein the image processor calibrates user specific orientation by performing morphological recognition of the first user's anatomy.

14. A system for operating a virtual environment session, comprising:
   at least two of the apparatus of claim 1; and
   a virtual environment server comprising:
      a virtual environment manager for providing the image data for the virtual environment and for managing a coordinate system of a virtual environment based on at least on the user specific position and orientation of the users in the virtual environment.

15. The system according to claim 14, wherein the virtual environment server further comprises an asset manager for recording and storing modifications to the virtual environment.

16. The system according to claim 14, wherein the virtual environment server further comprises a control unit for administrating virtual environment sessions, the administrating comprising at least one of login, troubleshooting, technical support, calibrating, events synchronisation, stream monitoring, access privileges/priority management.

17. A method for participating in a virtual environment session comprising
   continuously receiving image data of a first user;
   calibrating the image data of the first user to obtain a user specific orientation as a function of a reference orientation a virtual environment, the calibrating including determining the user specific orientation from a morphology of the first user's anatomy;
   continuously producing a first 3D representation of the first user based on the image data, the first 3D representation having at least punctually a user specific position and said user specific orientation in a virtual environment;
   transmitting the first 3D representation for at least a remote use in the virtual environment session;
   continuously receiving a second 3D representation of a second user, image data for the virtual environment, and at least punctually receiving user specific position and user specific orientation of the second 3D representation relative to the virtual environment, the user specific orientation of the second user being calibrated so as to be a function of the reference orientation of the virtual environment; and
   outputting for display at least the 3D representation of the second user positioned relative to the first user as inserted in the virtual environment based on said user specific positions and on said user specific orientation.

18. The method according to claim 17, further comprising outputting a reference orientation landmark for calibration of the first user's morphology relative to the reference orientation in the virtual environment, the user specific orientation of the first user based on the reference orientation landmark.

19. The method according to claim 18, wherein outputting the reference orientation landmark comprises outputting a mirror image of the 3D representation of the first user as the reference orientation landmark, the mirror image being orientable to set the user specific orientation of the first user.

20. The method according to claim 18, wherein calibrating the image data of the first user includes performing morphological recognition of the first user's anatomy.

* * * * *